(12) United States Patent
Piazza

(10) Patent No.: US 11,215,314 B1
(45) Date of Patent: Jan. 4, 2022

(54) HAND SANITIZER SUSPENSION ASSEMBLY

(71) Applicant: Stephen Piazza, Lodi, CA (US)

(72) Inventor: Stephen Piazza, Lodi, CA (US)

( * ) Notice: Subject to any disclaimer, the term of this patent is extended or adjusted under 35 U.S.C. 154(b) by 0 days.

(21) Appl. No.: 17/155,243

(22) Filed: Jan. 22, 2021

(51) Int. Cl.
*F16M 11/00* (2006.01)
*F16M 11/04* (2006.01)
*F16M 11/08* (2006.01)
*F16M 13/02* (2006.01)

(52) U.S. Cl.
CPC ........... *F16M 11/041* (2013.01); *F16M 11/08* (2013.01); *F16M 13/022* (2013.01); *F16M 2200/08* (2013.01)

(58) Field of Classification Search
CPC .... F16M 11/041; F16M 11/08; F16M 13/022; A47K 5/1211; A47K 5/1215; A47K 5/1204; A47J 47/16
See application file for complete search history.

(56) References Cited

U.S. PATENT DOCUMENTS

| | | | |
|---|---|---|---|
| 3,767,152 A | 10/1973 | Killinger | |
| 6,131,779 A | 10/2000 | Gendala | |
| 6,467,654 B1 | 10/2002 | Ayres | |
| D559,989 S | 1/2008 | Martinelli | |
| 8,668,178 B2 * | 3/2014 | Ziaylek | F17C 13/084 248/312 |
| 8,757,573 B1 * | 6/2014 | Barnes, Jr. | A47G 23/0225 248/311.2 |
| 10,667,654 B2 * | 6/2020 | Schultz | A47L 13/512 |
| 10,932,601 B1 * | 3/2021 | Fan | F16M 11/041 |
| 2005/0056746 A1 | 3/2005 | Landver | |
| 2005/0127120 A1 | 6/2005 | Pablo | |
| 2008/0128567 A1 * | 6/2008 | Rogers | A47K 1/09 248/122.1 |
| 2010/0212778 A1 * | 8/2010 | O'Brien | A47K 5/18 141/284 |
| 2013/0076514 A1 * | 3/2013 | Wegelin | G08B 21/245 340/573.1 |
| 2014/0284360 A1 | 9/2014 | Chorazewitz | |

FOREIGN PATENT DOCUMENTS

WO WO03047400 6/2003

* cited by examiner

Primary Examiner — Amy J. Sterling

(57) ABSTRACT

A hand sanitizer suspension assembly for suspending hand sanitizer from a work surface includes a clamp that has a pair of jaws biased together to engage an edge of a work surface. A shaft is coupled to and extends downwardly from a respective one of the jaws and a pivot is coupled to the shaft. A grapple is coupled to the pivot such that the grapple is pivotable around the shaft. A bottle is provided that contains liquid hand sanitizer. A hand pump is removably attached to the bottle to dispense the liquid hand sanitizer when the hand pump is manipulated. A disk attached to the hand pump and the grapple engages the disk for suspending the bottle from the work surface.

9 Claims, 6 Drawing Sheets

HAND SANITIZER SUSPENSION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to suspension devices and more particularly pertains to a new suspension device for suspending hand sanitizer from a work surface. The suspension device includes a clamp that is attachable to the work surface and a pivoting grapple that is suspended from the clamp that can releasably engage a disk on a bottle of handle sanitizer.

(2) Description of Related Art Including Information Disclosed Under 37 CFR 1.97 and 1.98

The prior art relates to suspension devices including a variety of carrying devices that can be engaged on an article of clothing for carrying a bottle shaped object. The prior art discloses a variety of suspension devices that can suspend a bottle from an object. In each case the suspension devices suspend the bottle in a fixed orientation. In no instance does the prior art disclose a suspension device that can suspend a bottle in a pivotal orientation.

BRIEF SUMMARY OF THE INVENTION

An embodiment of the disclosure meets the needs presented above by generally comprising a clamp that has a pair of jaws biased together to engage an edge of a work surface. A shaft is coupled to and extends downwardly from a respective one of the jaws and a pivot is coupled to the shaft. A grapple is coupled to the pivot such that the grapple is pivotable around the shaft. A bottle is provided that contains liquid hand sanitizer. A hand pump is removably attached to the bottle to dispense the liquid hand sanitizer when the hand pump is manipulated. A disk attached to the hand pump and the grapple engages the disk for suspending the bottle from the work surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
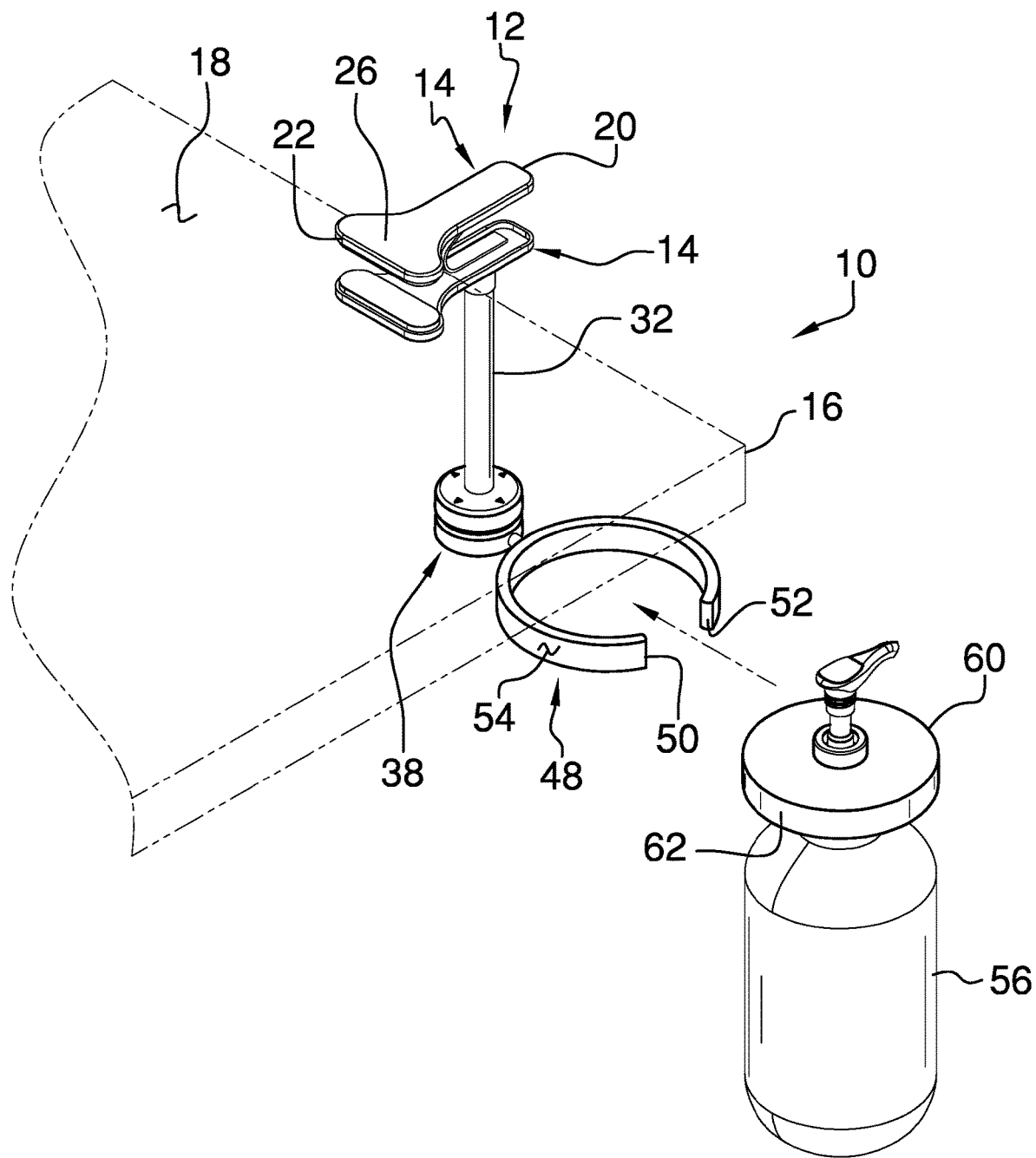
FIG. 1 is a perspective view of a hand sanitizer suspension assembly according to an embodiment of the disclosure.
Figure 2:
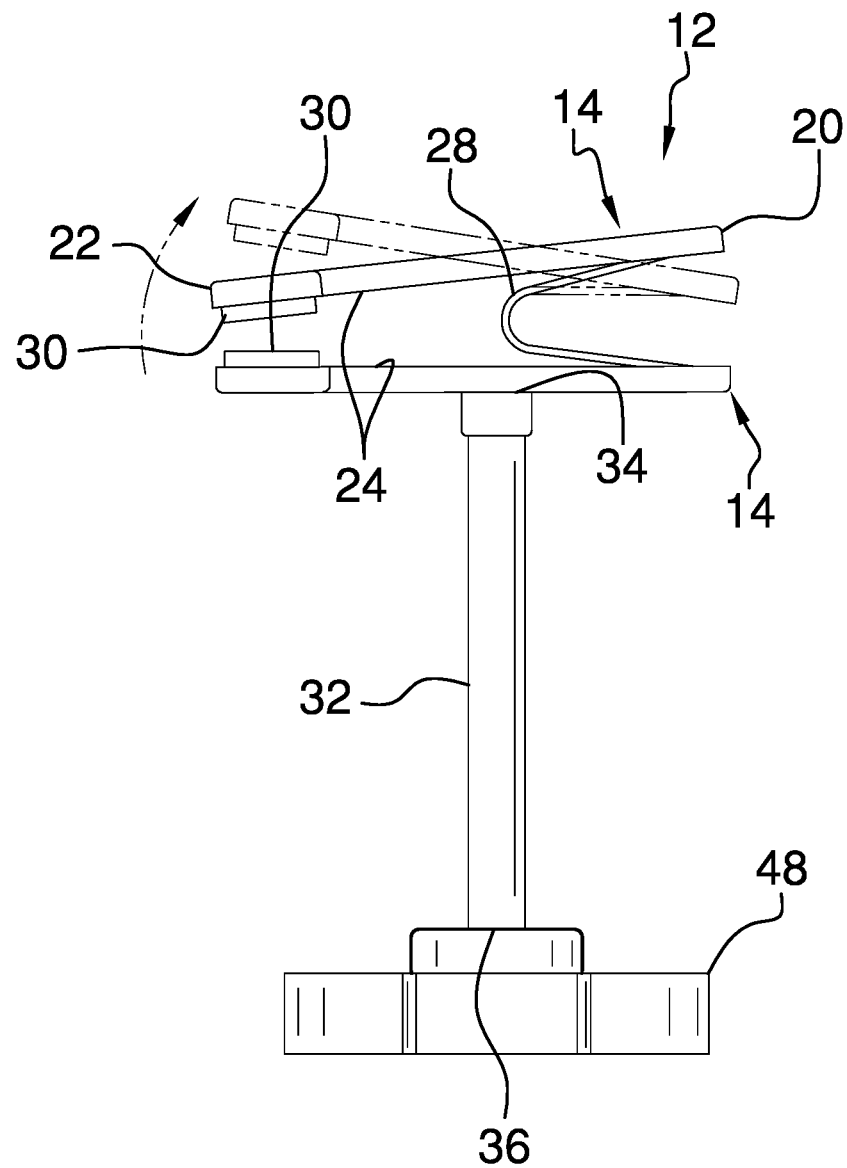
FIG. 2 is a left side view of an embodiment of the disclosure.
Figure 3:
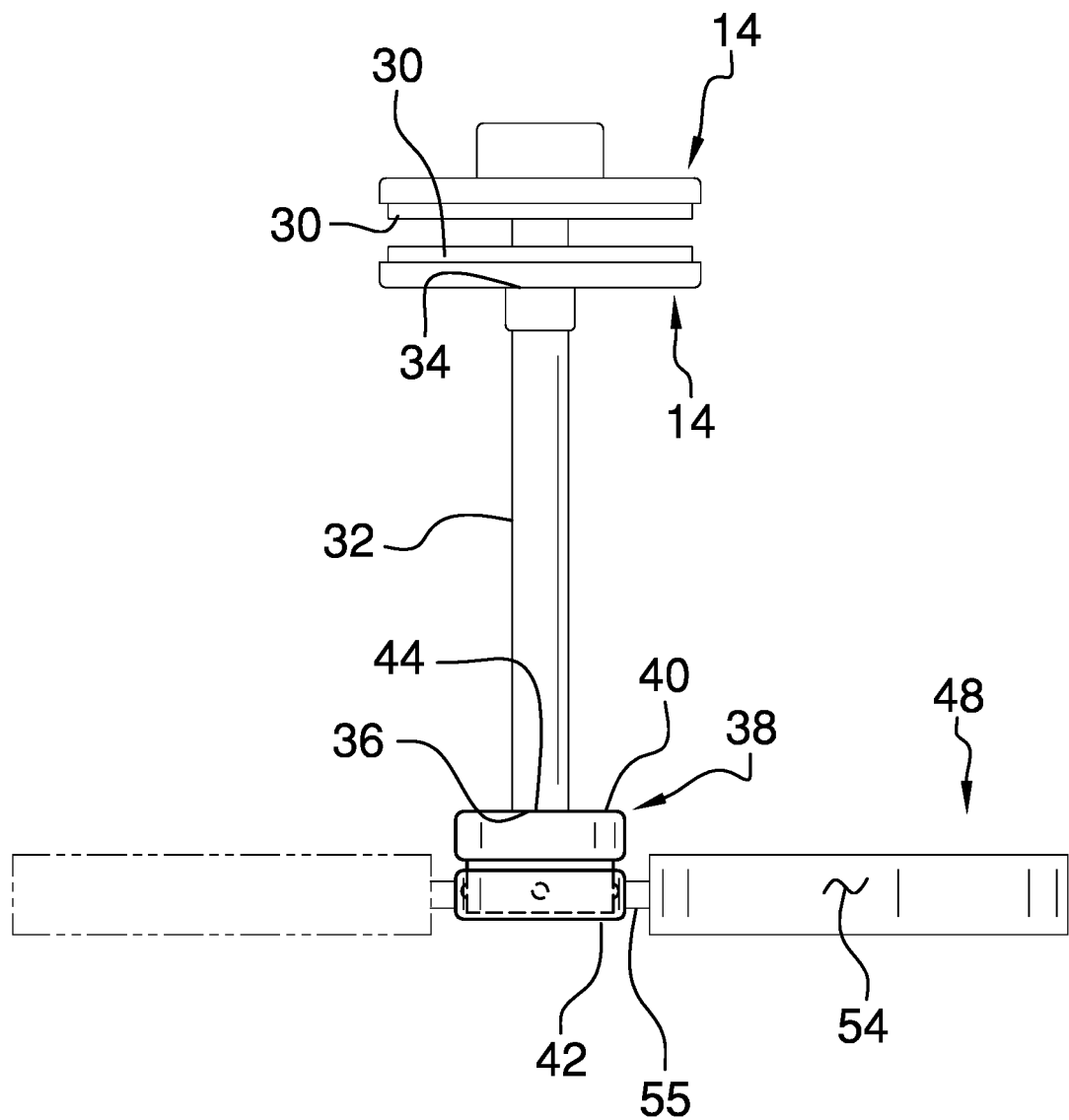
FIG. 3 is a front view of an embodiment of the disclosure.
Figure 4:
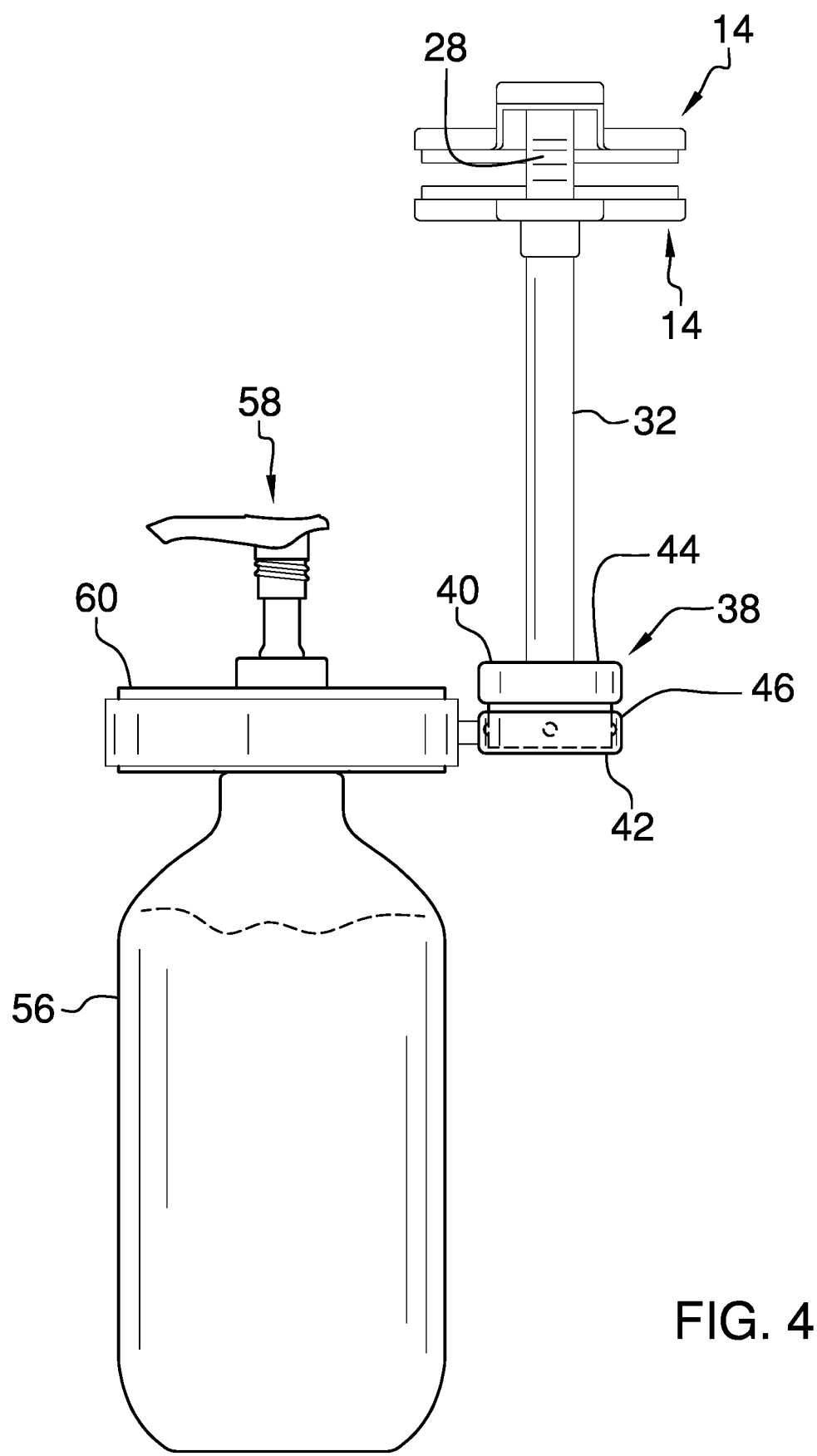
FIG. 4 is a back view of an embodiment of the disclosure.
Figure 5:
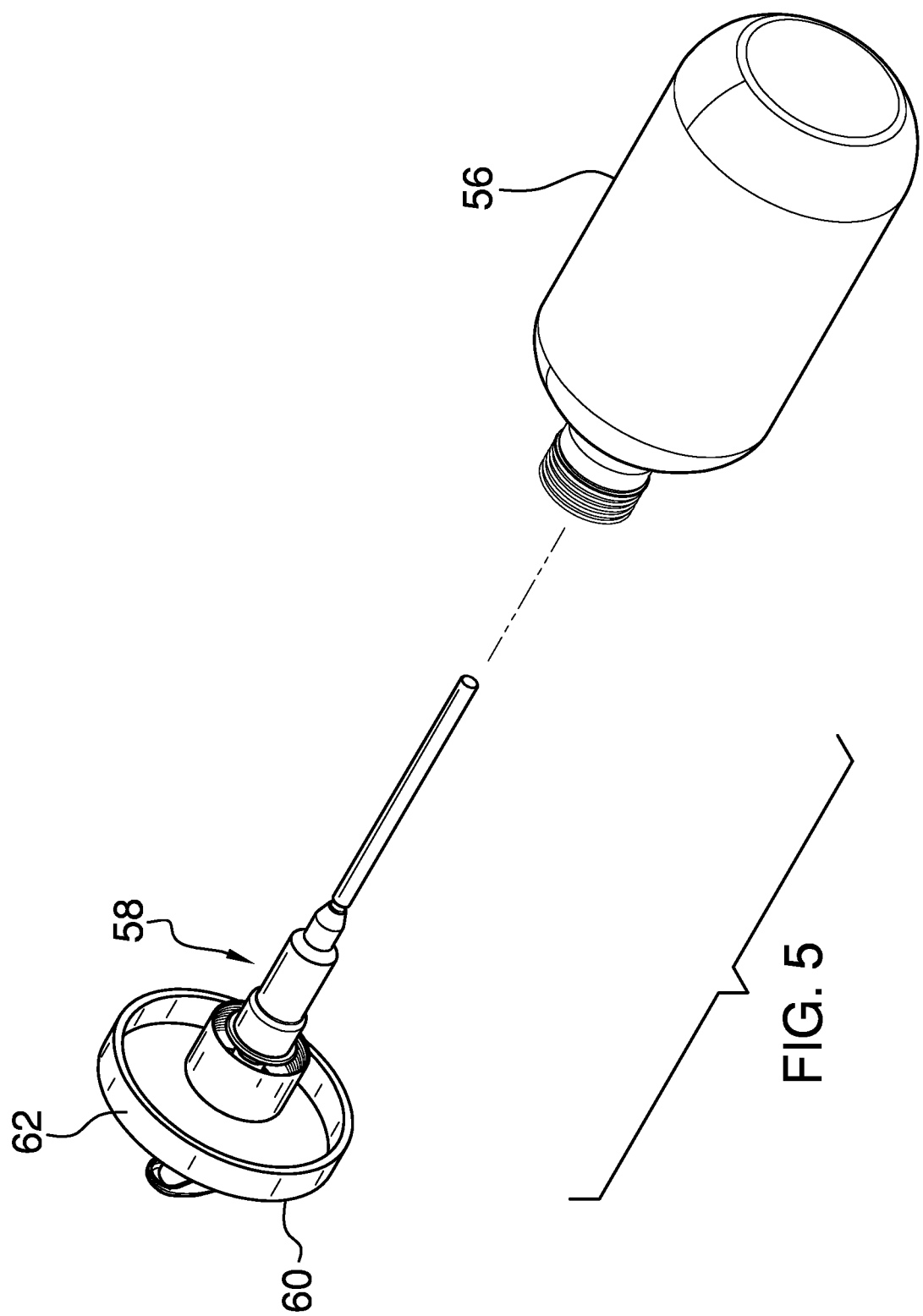
FIG. 5 is an exploded perspective view of a bottle and a hand pump of an embodiment of the disclosure.
Figure 6:
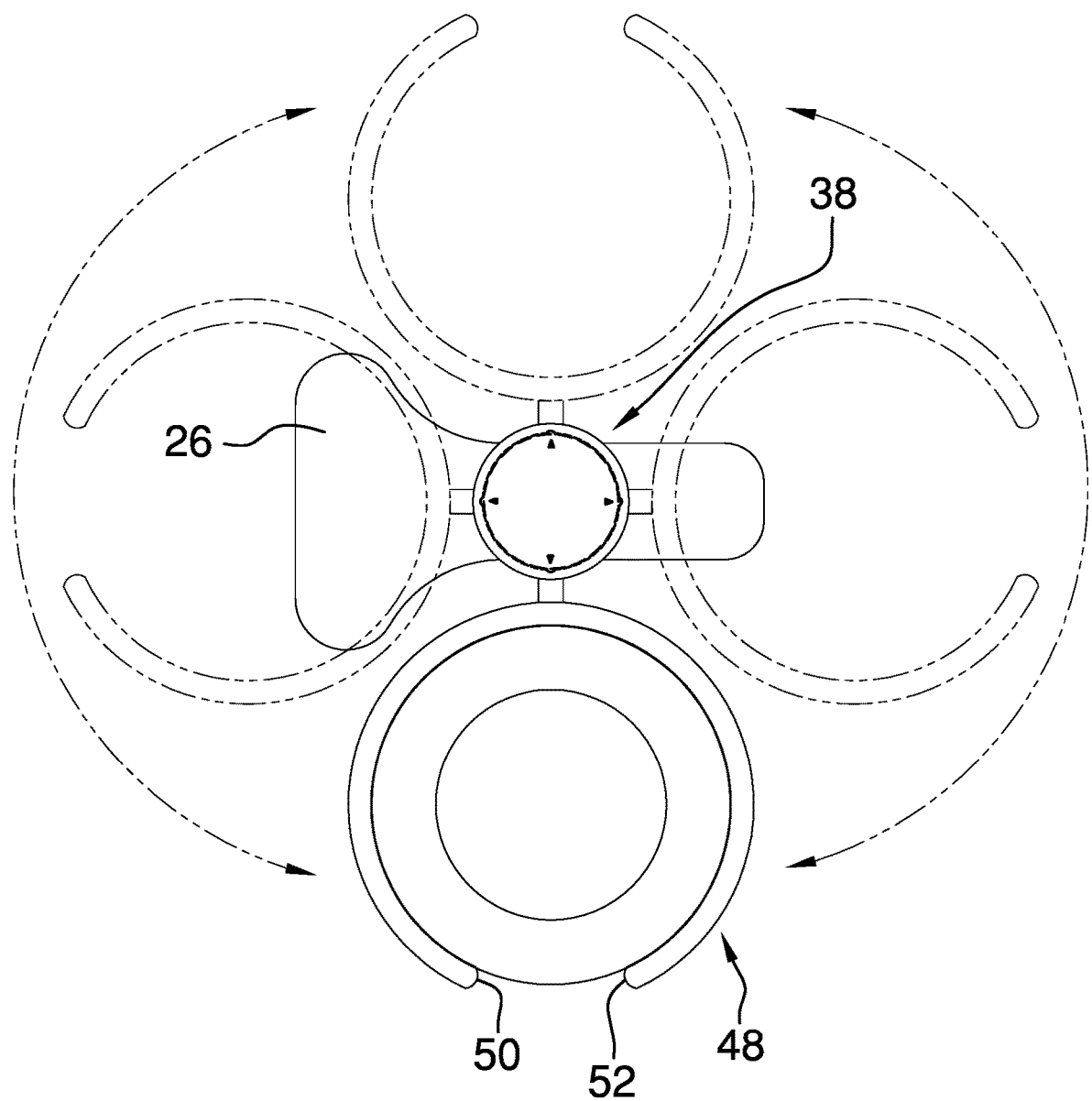
FIG. 6 is a bottom view of an embodiment of the disclosure showing a grapple being pivoted around a pivot.

With reference now to the drawings, and in particular to FIGS. 1 through 6 thereof, a new suspension device embodying the principles and concepts of an embodiment of the disclosure and generally designated by the reference numeral 10 will be described.

As best illustrated in FIGS. 1 through 6, the hand sanitizer suspension assembly 10 generally comprises a clamp 12 that has a pair of jaws 14 that are biased together to engage an edge 16 of a work surface 18. The work surface 18 may be a table top, a counter top or other elevated, planar work surface. Each of the jaws 14 has a first end 20, a second end 22 and a first surface 24 extending therebetween, and each of the jaws 14 is elongated between the first end 20 and the second end 22. The second end 22 of each of the jaws 14 has a width that is greater than the width of the first end 20 of each of the jaws 14 such that the second end 22 of each of the jaws 14 defines a paddle 26. The paddle 26 inhibits the jaws 14 from tipping laterally on the work surface 18 when the clamp 12 is engaged thereto. The pair of jaws 14 is oriented such that the first surface 24 of each of the jaws 14 is directed toward each other having the paddle 26 defined on each of the jaws 14 being aligned with each other.

A biasing member 28 is provided and the biasing member 28 is coupled between the first surface 24 of each of the jaws 14. The biasing member 28 biases the paddle 26 defined on each of the jaws 14 toward each other thereby facilitating the paddle 26 on each of the jaws 14 to compress against the work surface 18. The biasing member 28 may be a spring biasing member or other type of mechanical biasing member. A pair of pads 30 is each coupled to the first surface 24 of a respective one of the jaws 14 and each of the pads 30 is positioned on the paddle 26 defined on the respective jaw 14. Each of the pads 30 is comprised of a resiliently compressible material wherein to enhance gripping the work surface 18.

A shaft 32 is coupled to and extends downwardly from a respective one of the jaws 14. The shaft 32 has a first end 34 and a second end 36, and the first end 34 is coupled to the respective jaw 14. A pivot 38 is provided that has a first disk 40 that is rotatably engaged to a second disk 42. The first disk 40 has a top surface 44 and the second disk 42 has a perimeter edge 46. The second end 36 of the shaft 32 is coupled to the top surface 44 of the first disk 40 at a central point on the top surface 44. As is most clearly shown in FIG. 4, the first disk 40 may have a plurality of engagements 41 extending outwardly therefrom that can each releasably engage a respective engagement point 43 inside the second disk 42.

A grapple 48 is coupled to the pivot 38 such that the grapple 48 is pivotable around the shaft 32. The grapple 48 has a primary end 50, a secondary end 52 and a primary surface 54 extending therebetween, and the grapple 48 is elongated between the primary end 50 and the secondary end 52. The grapple 48 is curved between the primary end 50 and the secondary end 52 such that the grapple 48 forms an open ring having the primary end 50 being spaced from the secondary end 52. The grapple 48 is comprised of a resiliently bendable material such the primary end 50 and the secondary end 52 can be urged away from each other. A stem 55 is coupled between the primary surface 54 of the grapple 48 and the perimeter edge 44 of the second disk 42 of the pivot 38. Moreover, the grapple 48 lies on a plane that is oriented coplanar with the top surface 44 of the first disk 40 of the pivot 38.

A bottle 56 is provided and the bottle 56 contains a liquid hand sanitizer. A hand pump 58 is removably attached to the bottle 56 to dispense the liquid hand sanitizer when the hand pump 58 is manipulated. The hand pump 58 may be a depressible hand pump with a dispensing spout that is common to liquid soap bottles and other types. A disk 60 is provided and the hand pump 58 extends through the disk 60. The disk 60 has an outer edge 62 and the disk 60 is insertable into the grapple 48 having the grapple 48 engaging the outer edge 62 of the disk 60. In this way the bottle 56 is suspended from the work surface 18 to be accessible for use without taking up space on the work surface 18.

In use, the clamp 12 is engaged to the edge 16 of the work surface 18 at a location that is preferred by the user. The grapple 48 is pivoted into a preferred location and the disk 60 on the hand pump 58 is inserted into the grapple 48. In this way the bottle 56 is suspended from the work surface 18 at a location that is easily accessible to the user without occupying space on the work surface 18. The disk 60 is removable from the grapple 48 at any time for refilling the bottle 56 or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hand sanitizer suspension assembly for suspending a bottle of hand sanitizer from a work surface, said assembly comprising:
    a clamp having a pair of jaws being biased together wherein said clamp is configured to engage an edge of a work surface;
    a shaft being coupled to and extending downwardly from a respective one of said jaws;
    a pivot being coupled to said shaft;
    a grapple being coupled to said pivot such that said grapple is pivotable around said shaft;
    a bottle being configured to contain liquid hand sanitizer;
    a hand pump being removably attached to said bottle wherein said hand pump is configured to dispense the liquid hand sanitizer when said hand pump is manipulated; and
    a disk having said hand pump extending therethrough, said grapple engaging said disk for suspending said bottle from the work surface wherein said hand pump is configured to be accessible for use without taking up space on the work surface.

2. The assembly according to claim 1, wherein each of said jaws has a first end, a second end and a first surface extending therebetween, each of said jaws being elongated between said first end and said second end, said second end of each of said jaws having a width being greater than the width of said first end of each of said jaws such that said second end of each of said jaws defines a paddle wherein said paddle is configured to inhibit said jaws from tipping laterally on the work surface when said clamp is engaged thereto, said pair of jaws being oriented such that said first surface of each of said jaws is directed toward each other having said paddle defined on each of said jaws being aligned with each other.

3. The assembly according to claim 2, further comprising a biasing member being coupled between said first surface of each of said jaws, said biasing member biasing said paddle defined on each of said jaws toward each other wherein said paddle on each of said jaws is configured to compress against the work surface.

4. The assembly according to claim 2, further comprising a pair of pads, each of said pads being coupled to said first surface of a respective one of said jaws, each of said pads being positioned on said paddle defined on said respective jaw, each of said pads being comprised of a resiliently compressible material wherein each of said pads is configured to enhance gripping the work surface.

5. The assembly according to claim 1, wherein:
    said shaft has a first end and a second end, said first end being coupled to said respective jaw; and
    said pivot has a first disk being rotatably engaged to a second disk, said first disk having a top surface, said second disk having a perimeter edge, said second end of said shaft being coupled to said top surface of said first disk at a central point on said top surface.

6. The assembly according to claim 1, wherein said grapple has a primary end, a secondary end and a primary surface extending therebetween, said grapple being elongated between said primary end and said secondary end, said grapple being curved between said primary end and said secondary end such that said grapple forms an open ring having said primary end being spaced from said secondary end.

7. The assembly according to claim 6, wherein said grapple is comprised of a resiliently bendable material such said primary end and said secondary end can be urged away from each other.

8. The assembly according to claim 6, wherein:
said pivot has a first disk being rotatably engaged to a second end, said first disk having a top surface, said second disk having a perimeter edge, said second end of said shaft being coupled to said top surface of said first disk at a central point on said top surface; and
said assembly includes a stem being coupled between said primary surface of said grapple and said perimeter edge of said second disk of said pivot such that said grapple lies on a plane being oriented coplanar with said top surface of said first disk of said pivot.

9. A hand sanitizer suspension assembly for suspending a bottle of hand sanitizer from a work surface, said assembly comprising:
a clamp having a pair of jaws being biased together wherein said clamp is configured to engage an edge of a work surface, each of said jaws having a first end, a second end and a first surface extending therebetween, each of said jaws being elongated between said first end and said second end, said second end of each of said jaws having a width being greater than the width of said first end of each of said jaws such that said second end of each of said jaws defines a paddle wherein said paddle is configured to inhibit said jaws from tipping laterally on the work surface when said clamp is engaged thereto, said pair of jaws being oriented such that said first surface of each of said jaws is directed toward each other having said paddle defined on each of said jaws being aligned with each other;
a biasing member being coupled between said first surface of each of said jaws, said biasing member biasing said paddle defined on each of said jaws toward each other wherein said paddle on each of said jaws is configured to compress against the work surface;
a pair of pads, each of said pads being coupled to said first surface of a respective one of said jaws, each of said pads being positioned on said paddle defined on said respective jaw, each of said pads being comprised of a resiliently compressible material wherein each of said pads is configured to enhance gripping the work surface;
a shaft being coupled to and extending downwardly from a respective one of said jaws, said shaft having a first end and a second end, said first end being coupled to said respective jaw;
a pivot having a first disk being rotatably engaged to a second disk, said first disk having a top surface, said second disk having a perimeter edge, said second end of said shaft being coupled to said top surface of said first disk at a central point on said top surface;
a grapple being coupled to said pivot such that said grapple is pivotable around said shaft, said grapple having a primary end, a secondary end and a primary surface extending therebetween, said grapple being elongated between said primary end and said secondary end, said grapple being curved between said primary end and said secondary end such that said grapple forms an open ring having said primary end being spaced from said secondary end, said grapple being comprised of a resiliently bendable material such said primary end and said secondary end can be urged away from each other;
a stem being coupled between said primary surface of said grapple and said perimeter edge of said second disk of said pivot such that said grapple lies on a plane being oriented coplanar with said top surface of said first disk of said pivot;
a bottle being configured to contain liquid hand sanitizer;
a hand pump being removably attached to said bottle wherein said hand pump is configured to dispense the liquid hand sanitizer when said hand pump is manipulated; and
a disk having said hand pump extending therethrough, said disk having an outer edge, said disk being insertable into said grapple having said grapple engaging said outer edge of said disk for suspending said bottle from the work surface wherein said hand pump is configured to be accessible for use without taking up space on the work surface.

* * * * *